US012592339B2

(12) United States Patent
Ohara et al.

(10) Patent No.: US 12,592,339 B2
(45) Date of Patent: Mar. 31, 2026

(54) MULTILAYER CERAMIC CAPACITOR

(71) Applicant: Murata Manufacturing Co., Ltd., Nagaokakyo (JP)

(72) Inventors: Takashi Ohara, Nagaokakyo (JP); Hideyasu Onishi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 107 days.

(21) Appl. No.: 18/609,020

(22) Filed: Mar. 19, 2024

(65) Prior Publication Data

US 2024/0222016 A1 Jul. 4, 2024

Related U.S. Application Data

(63) Continuation of application No. PCT/JP2023/017694, filed on May 11, 2023.

(30) Foreign Application Priority Data

Jun. 26, 2022 (JP) ................................. 2022-102291

(51) Int. Cl.
| | |
|---|---|
| *H01G 4/008* | (2006.01) |
| *H01G 4/012* | (2006.01) |
| *H01G 4/12* | (2006.01) |
| *H01G 4/232* | (2006.01) |
| *H01G 4/30* | (2006.01) |

(52) U.S. Cl.
CPC ............. *H01G 4/0085* (2013.01); *H01G 4/30* (2013.01); *H01G 4/012* (2013.01); *H01G 4/1227* (2013.01); *H01G 4/1236* (2013.01); *H01G 4/2325* (2013.01)

(58) Field of Classification Search
CPC ........ H01G 4/0085; H01G 4/30; H01G 4/012; H01G 4/1227; H01G 4/1236; H01G 4/2325
See application file for complete search history.

(56) References Cited

U.S. PATENT DOCUMENTS

| | | | | |
|---|---|---|---|---|
| 2017/0352487 A1* | 12/2017 | Kayatani | ................... | H01G 4/30 |
| 2018/0068790 A1* | 3/2018 | Chigira | ................... | H01G 4/12 |
| 2018/0197682 A1* | 7/2018 | Yamada | ................ | H01G 4/005 |

FOREIGN PATENT DOCUMENTS

| | | | |
|---|---|---|---|
| JP | H05304043 A | | 11/1993 |
| JP | H0645183 A | | 2/1994 |
| JP | H07192528 A | * | 7/1995 |
| JP | 2016031807 A | | 3/2016 |

(Continued)

OTHER PUBLICATIONS

International Search Report in PCT/JP2023/017694, mailed Aug. 1, 2023, 3 pages.

(Continued)

*Primary Examiner* — Michael P McFadden
(74) *Attorney, Agent, or Firm* — Keating & Bennett, LLP

(57) ABSTRACT

A multilayer ceramic capacitor includes a multilayer body including dielectric layers made of ceramic and stacked together, and inner electrodes arranged along multiple interfaces between the dielectric layers, with each inner electrode extending along a respective interface. The inner electrodes include silver as a conductive material and also include at least one of $AgTiO_3$, $EuTiO_3$, or $NaTiO_3$.

12 Claims, 1 Drawing Sheet

(56)  References Cited

FOREIGN PATENT DOCUMENTS

| JP | 2016079345 A | 5/2016 |
| JP | 2018041814 A | 3/2018 |
| JP | 2020202245 A | 12/2020 |

OTHER PUBLICATIONS

Written Opinion in PCT/JP2023/017694, mailed Jan. 8, 2023, 4 pages.

* cited by examiner

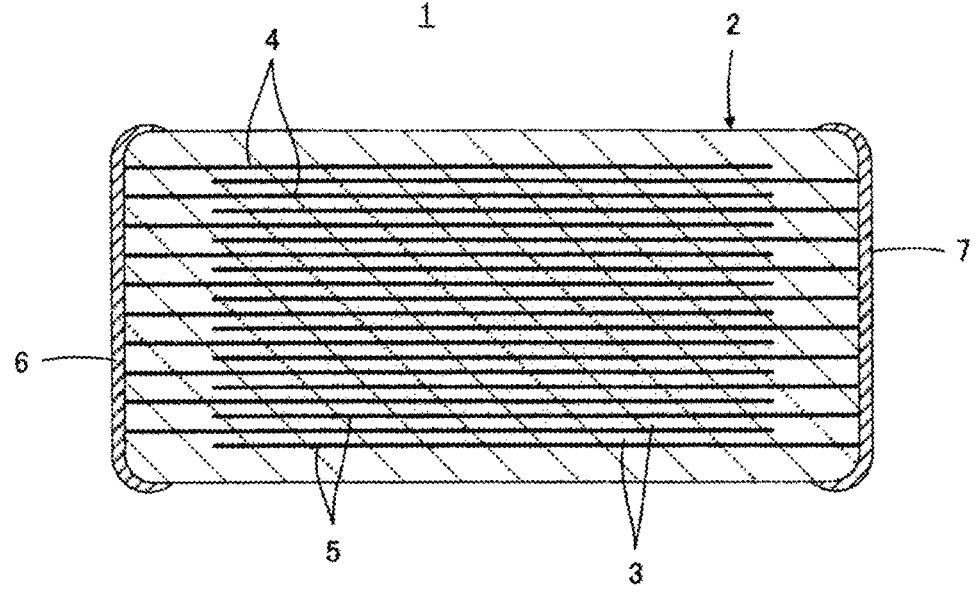

MULTILAYER CERAMIC CAPACITOR

CROSS REFERENCE TO RELATED APPLICATIONS

This application claims the benefit of priority to Japanese Patent Application No. 2022-102291 filed on Jun. 26, 2022 and is a Continuation Application of PCT Application No. PCT/JP2023/017694 filed on May 11, 2023. The entire contents of each application are hereby incorporated herein by reference.

BACKGROUND OF THE INVENTION

1. Field of the Invention

The present invention relates to multilayer ceramic capacitors and compositions of inner electrodes included in multilayer ceramic capacitors.

2. Description of the Related Art

A multilayer ceramic capacitor typically includes a multilayer body including multiple dielectric layers made of ceramic and stacked together and multiple inner electrodes arranged along multiple interfaces between the dielectric layers, with each inner electrode along a respective interface, and multiple outer electrodes provided at the outer surface of the multilayer body and electrically coupled to the inner electrodes. The inner electrodes include multiple first inner electrodes and multiple second inner electrodes arranged alternately in the direction of stacking in the multilayer body, and the outer electrodes include a first outer electrode electrically coupled to the first inner electrodes and a second outer electrode electrically coupled to the second inner electrodes.

In an attempt to reduce the size and increase the capacitance of a multilayer ceramic capacitor in such a structure simultaneously, it is required to form the dielectric layers and inner electrodes as thin layers while increasing the coverage of the inner electrodes (electrode continuity). In general, in a firing step during the manufacture of a multilayer ceramic capacitor, the sintering temperature of conductive metal particles included in conductive paste films that are to be the inner electrodes is lower than the sintering temperature of the ceramic that forms the dielectric layers, which means that the metal particles included in the inner electrodes are sintered first. This causes a reduced coverage of the inner electrodes. In particular, inner electrodes formed as thin layers, for example reduced to a thickness of 1 μm or less, are apt to have a low coverage. With such inner electrodes, there is a disadvantage that such a low coverage often hinders increasing the capacitance.

To form thin-layer inner electrodes with a high coverage, therefore, it is necessary to increase the temperature at which the conductive metal particles included in the conductive paste films that are to be the inner electrodes sinter in the firing step during the manufacture of the multilayer ceramic capacitor. This helps bring the temperature at which the metal particles included in the conductive paste films that are to be the inner electrodes sinter closer to the temperature at which the ceramic that forms the dielectric layers starts sintering, thereby helping make the onset of shrinkage during sintering closer between the inner electrodes and the dielectric layers. As a result, the coverage of the inner electrodes increases, helping achieve a large capacitance.

As a way to increase the coverage of the inner electrodes and achieve a large capacitance by the method described above, it is known to add a ceramic material including a composition similar to the composition of the ceramic that forms the dielectric layers, or, in other words, a common material, to the conductive paste for the formation of the inner electrodes, for example as described in paragraph of Japanese Unexamined Patent Application Publication No. 2016-31807. By adding a common material, it is possible to shift the onset of sintering of the metal particles included in the conductive paste films that are to be the inner electrodes toward higher temperatures and thereby to bring the temperature at which the metal particles included in the conductive paste films sinter closer to the temperature at which the ceramic that forms the dielectric layers sinters.

SUMMARY OF THE INVENTION

It is, however, undeniable that even after the addition of a common material to the conductive paste for the formation of inner electrodes, the temperature at which the metal particles included in the conductive paste sinter remains lower than the temperature at which the ceramic that forms the dielectric layers sinters. Thus, there is a need for further improvement. In particular, for inner electrodes formed as thin layers, for example, reduced to a thickness of 1 μm or less, there is a compelling necessity for an effective solution for the problem of reduced coverage, which hinders increasing the capacitance.

Example embodiments of the present invention provide multilayer ceramic capacitors each including inner electrodes that maintain a relatively high coverage even when formed as thin layers.

A multilayer ceramic capacitor according to an example embodiment of the present invention includes a multilayer body including multiple dielectric layers made of ceramic and stacked together and multiple inner electrodes arranged along multiple interfaces between the dielectric layers, with each inner electrode extending along a respective interface.

The inner electrodes in an example embodiment of the present invention include silver and at least one of $AgTiO_3$, $EuTiO_3$, or $NaTiO_3$.

According to an example embodiment of the present invention, the at least one of $AgTiO_3$, $EuTiO_3$, or $NaTiO_3$ included in the inner electrodes contributes to increasing the coverage of the inner electrodes, which include silver as a conductive material. Even when the inner electrodes are formed as thin layers, therefore, the coverage of the inner electrodes does not decrease, thus ensuring increased capacitance of the multilayer ceramic capacitors.

The above and other elements, features, steps, characteristics and advantages of the present invention will become more apparent from the following detailed description of the example embodiments with reference to the attached drawings.

BRIEF DESCRIPTION OF THE DRAWINGS

FIG. 1 is a cross-sectional view schematically illustrating a multilayer ceramic capacitor 1 according to an example embodiment of the present invention.

DETAILED DESCRIPTION OF THE EXAMPLE EMBODIMENTS

With reference to FIG. 1, the structure of a multilayer ceramic capacitor 1 according to an example embodiment of this invention will be described.

The multilayer ceramic capacitor 1 includes a multilayer body 2. The multilayer body 2 includes multiple dielectric layers 3 made of ceramic and stacked together and multiple inner electrodes 4 and 5 arranged along the interfaces between the multiple dielectric layers 3. The inner electrodes 4 and 5 are categorized into multiple first inner electrodes 4 and multiple second inner electrodes 5 arranged alternately in the direction of stacking in the multilayer body 3. At the outer surface of the multilayer body 2, or more specifically the end surfaces facing each other, a first outer electrode 6 and a second outer electrode 7 are provided, with each outer electrode at a respective end surface. The first outer electrode 6 is electrically coupled to the first inner electrodes 4, and the second outer electrode 7 is electrically coupled to the second inner electrodes 5.

The dielectric layers 3 are made of a ceramic that includes, for example, $ABO_3$ (A is at least one of Ba, Ca, or Sr, and B is at least one of Ti or Zr) as a base material. The ceramic may include the $ABO_3$ as a base material and further include at least one of Mn, Mg, Si, Y, Dy, or Gd as a minor additional material.

The inner electrodes 4 and 5 include silver as a conductive material. As a characteristic composition, furthermore, the inner electrodes 4 and 5 include at least one of $AgTiO_3$, $EuTiO_3$, or $NaTiO_3$. $AgTiO_3$, $EuTiO_3$, and $NaTiO_3$ have an ilmenite crystal structure.

As can be seen from the experimental examples described later herein, in an example embodiment, the dielectric layers 3 are made of a ceramic that includes at least one of $BaTiO_3$, $SrTiO_3$, or $CaZrO_3$ as a base material, and the inner electrodes 4 and 5 include silver as a conductive material, include at least one of $AgTiO_3$, $EuTiO_3$, or $NaTiO_3$ as a ceramic material, and, optionally, further include the at least one of $BaTiO_3$, $SrTiO_3$, or $CaZrO_3$ included in the dielectric layers 3.

The outer electrodes 6 and 7 are formed by, for example, applying a conductive paste in which Ag or Cu is the base ingredient in the conductive material to the end surfaces of the multilayer body 2 and baking the applied paste. Optionally, the thick films formed through baking may be coated with, for example, Ni plating and Sn plating on it.

The multilayer ceramic capacitor 1 is manufactured through, for example, steps such as the following. First, a ceramic slurry including raw material powders for ceramic that will provide a composition as described above is produced. Then ceramic green sheets are shaped by applying an appropriate sheet shaping method to the ceramic slurry. Then a conductive paste that is to be each of the inner electrodes 4 and 5 is applied onto predetermined ones of the multiple ceramic green sheets, for example by printing. Then the multiple ceramic green sheets are stacked together and then pressure-bonded to provide a raw multilayer body. Then the raw multilayer body is fired. In this step of firing, the ceramic green sheets turn into the dielectric layers 3. Thereafter, the outer electrodes 6 and 7 are formed at the end surfaces of the multilayer body 3.

The conductive paste that is to be the inner electrodes 4 and 5 used during the above-described manufacture of the multilayer ceramic capacitor 1 is preferably produced as follows.

In the production of the conductive paste, a first step, in which a ceramic powder slurry including at least one ceramic powder, an organic solvent, and a dispersant is prepared, a second step, in which a metal powder slurry including a conductive metal powder, an organic solvent, and a dispersant is prepared, a third step, in which an organic vehicle including an organic resin component and an organic solvent is prepared, and a fourth step, in which the ceramic powder slurry, metal powder slurry, and organic vehicle are mixed together, are carried out.

To be more specific, in the first step, a ceramic powder slurry is prepared by mixing at least one ceramic powder and a dispersant into an organic solvent.

The ceramic powder is, for example, a powder of at least one of $AgTiO_3$, $EuTiO_3$, or $NaTiO_3$ as $ABO_3$ oxides. In addition, a powder of at least one of $BaTiO_3$, $SrTiO_3$, or $CaZrO_3$ as common materials is used in some cases.

Since the conductive metal powder included in the metal powder slurry prepared in the second step, which will be described later herein, includes silver, the aforementioned $AgTiO_3$, $EuTiO_3$, or $NaTiO_3$ as $ABO_3$ oxides are oxides of $ABO_3$ type with a specified ionic radius in which the ratio of the six-coordinate ionic radius of the A-site element in $ABO_3$ to the six-coordinate ionic radius of silver is about 0.89 or greater and about 1.02 or less.

With a ceramic powder formed from at least one of $AgTiO_3$, $EuTiO_3$, or $NaTiO_3$ as $ABO_3$ oxides, the reaction that can occur between it and the silver powder included in the metal powder slurry prepared in the second step can be moderated. The ceramic powder may include the $ABO_3$ oxide as a base material and further include at least one of Mn, Mg, Si, Y, Dy, or Gd as a minor additional material. When the ceramic powder includes such a minor additional material, the sintering of the metal particles is effectively inhibited in some cases, as a result of controlled growth of ceramic particles.

The dispersant mixed into the ceramic powder in the first step can be, for example, an anionic polymer dispersant. The organic solvent can be, for example, dihydroterpineol.

In the second step, a metal powder slurry is prepared by mixing a conductive metal powder and a dispersant into an organic solvent. The conductive metal powder is a powder of silver. A dispersant and an organic solvent that can be used in the second step are the same as in the first step.

In the third step, an organic vehicle is prepared by mixing an organic resin component into an organic solvent. The organic resin component can be, for example, ethyl cellulose resin. An organic solvent that can be used in the third step, too, is the same as in the first step.

In the fourth step, the ceramic powder slurry, metal powder slurry, and organic vehicle described above are mixed together. Through this, a conductive paste that is to be the inner electrodes 4 and 5 is obtained. This conductive paste includes a ceramic powder slurry, and, as stated earlier herein, the ceramic powder slurry includes a ceramic powder formed from at least one of $AgTiO_3$, $EuTiO_3$, or $NaTiO_3$ as $ABO_3$ oxides with a specified ionic radius. The inner electrodes 4 and 5 included in the multilayer ceramic capacitor 1 manufactured through a firing step, therefore, will include at least one of $AgTiO_3$, $EuTiO_3$, or $NaTiO_3$.

EXPERIMENTAL EXAMPLES

Experimental examples conducted to verify advantages provided by example embodiments of the present invention will now be described.

In these experimental examples, a silver powder was prepared as the conductive metal powder included in the conductive paste for the formation of inner electrodes.

Separately, as $ABO_3$ oxides with a specified ionic radius to serve as components of the ceramic powder included in the conductive paste for the formation of inner electrodes, $CuTiO_3$, $SrTiO_3$, $BaTiO_3$, and $CaZrO_3$ were prepared in addition to $AgTiO_3$, $EuTiO_3$, and $NaTiO_3$. In Table 1, the "crystal structure," "coordination number," "A-site element," and "ionic radius" are presented for these $ABO_3$ oxides. It should be noted that Sr, Ba, and Ca are twelve-coordinate when they are in their native perovskite structure, but become six-coordinate when they dissolve in the sites of the six-coordinate element (Ag, Eu, or Na) in the ilmenite structure. Consequently, for Sr, Ba, and Ca, too, the "ionic radius" in Table 1 represents a six-coordinate value.

TABLE 1

| $ABO_3$ oxide | Crystal structure | Coordination number | A-site element | Ionic radius [Å] |
|---|---|---|---|---|
| $AgTiO_3$ | Ilmenite | 6 | Ag | 1.15 |
| $EuTiO_3$ | Ilmenite | 6 | Eu | 1.17 |
| $NaTiO_3$ | Ilmenite | 6 | Na | 1.02 |
| $CuTiO_3$ | Ilmenite | 6 | Cu | 0.73 |
| $SrTiO_3$ | Perovskite | 12 | Sr | 1.18 |
| $BaTiO_3$ | Perovskite | 12 | Ba | 1.35 |
| $CaZrO_3$ | Perovskite | 12 | Ca | 1.00 |

Experimental Examples 1, 2, and 3, which were conducted with different ceramic raw materials forming the dielectric layers, will now be described.

Experimental Example 1

Base material of the Ceramic Forming the Dielectric Layers: $BaTiO_3$
1. Preparation of a $BaTiO_3$ Ceramic Raw Material that Will Form the Dielectric Layers As starting materials, powders of $BaCO_3$ and $TiO_2$, which were base ingredients, were weighed out and mixed together for 72 hours in a ball mill. Then the resulting mixture was subjected to heat treatment for 2 hours with the maximum temperature being 1000° C., yielding a thermally treated powder. Separately, as minor ingredients, powders of MnO, $Dy_2O_3$, MgO, $SiO_2$, and $BaCO_3$ were prepared and weighed out in such a manner that the proportions of the minor ingredient powders to the thermally treated powder would be as in $100BaTiO_3+0.5Mm+1.0Dy+1.0Mg+1.0Si+2.0Ba$. These minor ingredient powders were added to the thermally treated powder, the powders were mixed together for 24 hours in a ball mill, and then the resulting mixture was dried. In this manner, a $BaTiO_3$ ceramic raw material powder was obtained.
2. Preparation of a Conductive Paste for the Formation of Inner Electrodes A powder of the "$ABO_3$ oxide" specified in Table 2, which will be provided later herein, and the $BaTiO_3$ ceramic raw material powder for dielectric layers described above were used as ceramic powders included in the conductive paste for the formation of inner electrodes.

The powder of an "$ABO_3$ oxide" and $BaTiO_3$ ceramic raw material powder were weighed out to the "percentages added" specified in Table 2. These powders and dihydroterpineol as the organic solvent and an anionic polymer dispersant as the dispersant were subjected to preliminary mixing in a stirring mill without a medium, and then dispersion treatment was performed in a medium stirring mill. In this manner, a ceramic powder slurry was prepared (first step).

Separately, a metal powder slurry was prepared by subjecting a silver powder as the conductive metal powder, dihydroterpineol as the organic solvent, and an anionic polymer dispersant as the dispersant to dispersion treatment in a three-roll mill (second step).

An organic vehicle, furthermore, was obtained by mixing ethyl cellulose resin as the organic resin component with dihydroterpineol, which is an organic solvent (third step).

Thereafter, the metal powder slurry and ceramic powder slurry described above were added to the organic vehicle described above, and mixing and dispersion treatment was performed. In this manner, a conductive paste for the formation of inner electrodes was prepared (fourth step).

In Table 2, the ratio of the six-coordinate ionic radius of the A-site element to the six-coordinate ionic radius of silver, which was to be included in the inner electrodes, or the "ionic radius ratio (A-site element/metallic silver)," is presented. It should be noted that for sample 8, the ratio of the six-coordinate ionic radius of the Ba element (1.35 Å), indicated in Table 1, to the six-coordinate ionic radius of silver (1.15 Å) is presented.
3. Production of a Multilayer Ceramic Capacitor A ceramic slurry including the $BaTiO_3$ ceramic raw material powder prepared in 1 above was prepared, and then ceramic green sheets were shaped by applying doctor blading to the ceramic slurry. Then the conductive paste for the formation of inner electrodes prepared in 2 above was applied onto predetermined ones of the multiple ceramic green sheets by screen printing. Then the multiple ceramic green sheets were stacked together and then pressure-bonded to provide a raw multilayer body. Then the raw multilayer body was fired. Thereafter, outer electrodes were formed at the end surfaces of the sintered multilayer body. In this manner, a sample multilayer ceramic capacitor was produced.
4. Evaluation

TABLE 2

| Sample | $ABO_3$ oxide | Percentage added [% by volume] | | Ionic radius ratio (A-site element/ metallic silver) | Coverage [%] | Assessment |
|---|---|---|---|---|---|---|
| | | $ABO_3$ oxide | $BaTiO_3$ | | | |
| 1 | $AgTiO_3$ | 100 | 0 | 1.00 | 85 | ○ |
| 2 | $EuTiO_3$ | 100 | 0 | 1.02 | 85 | ○ |
| 3 | $NaTiO_3$ | 100 | 0 | 0.89 | 84 | ○ |
| 4 | $SrTiO_3$ | 100 | 0 | 1.03 | 76 | x |
| 5 | $AgTiO_3$ | 10 | 90 | 1.00 | 83 | ○ |
| 6 | $EuTiO_3$ | 10 | 90 | 1.02 | 83 | ○ |
| 7 | $NaTiO_3$ | 10 | 90 | 0.89 | 82 | ○ |
| 8 | — | — | 100 | 1.17 | 75 | x |

An inner electrode and a dielectric layer located in the middle, in the height direction, of the multilayer body included in the sample multilayer ceramic capacitor were torn apart from each other by electric field separation.

Then the vicinity of the center (for example, the position at about ½ in the width direction and about ½ in the length direction) of the exposed inner electrode was observed using a microscope at a magnification of 100 times. By analyzing the obtained image, the percentage of the area that the conductive film as an inner electrode occupied in the exposed portion was determined as the "coverage" presented in Table 2. Samples with a "coverage" of 80% or more were determined to be good; "○" was entered in the "Assessment" section. Samples with a "coverage" of lower than 80% were determined to be poor; "x" was entered in the "Assessment" section.
5. Discussion Samples 1 to 3 and 5 to 7 in Table 2 received an "assessment" of "○." For these samples 1 to 3 and 5 to 7, the inner electrodes include any of $AgTiO_3$, $EuTiO_3$, or $NaTiO_3$ as an $ABO_3$ oxide. The inner electrodes, furthermore, include silver as a conductive material.

Ionic radii are focused on here. First, as indicated in the "$AgTiO_3$" section in Table 1, the six-coordinate ionic radius of silver is 1.15 Å. Meanwhile, the six-coordinate ionic radii of the A-site elements in $AgTiO_3$, $EuTiO_3$, and $NaTiO_3$ as the $ABO_3$ oxides included in the inner electrodes of samples 1 to 3 and 5 to 7 are 1.15 Å, 1.17 Å, and 1.02 Å, respectively, as presented in Table 1.

For samples 1 to 3 and 5 to 7, which were rated "○," the ratio of the six-coordinate ionic radius of the A-site element in $ABO_3$ to the six-coordinate ionic radius of the metal element included in the conductive metal particles, or the "ionic radius ratio," is about 0.89 or greater and about 1.02 or less.

Overall, for $AgTiO_3$, $EuTiO_3$, and $NaTiO_3$ as the $ABO_3$ oxides in samples 1 to 3 and 5 to 7, the six-coordinate ionic radius of the A-site element in $ABO_3$ is equal to or close to the six-coordinate ionic radius of silver as the conductive metal that is to be included in the inner electrodes. The energy difference between the oxide and silver in the inner electrodes, therefore, is 0 or small, allowing the oxide to remain in the inner electrode portion rather than being expelled. The oxide acts to improve the heat resistance of the inner electrodes. Presumably as a result of this, samples 1 to 3 and 5 to 7 achieved a high coverage of about 82% or more.

As can be seen from samples 5 to 7, furthermore, the percentage of $AgTiO_3$, $EuTiO_3$, or $NaTiO_3$ added is not necessarily 100%. As long as the percentage was about 10% or more, the advantage of improved coverage was observed compared with when none of $AgTiO_3$, $EuTiO_3$, or $NaTiO_3$ was included.

In contrast to these, for sample 4, which was rated "×," the $ABO_3$ oxide was $SrTiO_3$. The six-coordinate ionic radius of Sr, which is the A-site element in $ABO_3$, is 1.18 Å, as presented in Table 1. Accordingly, the ratio of the six-coordinate ionic radius of Sr to the six-coordinate ionic radius of silver, or the "ionic radius ratio," is 1.03. The "ionic radius ratio," therefore, fell outside the range of about 0.89 to about 1.02, resulting in a low coverage of 76%.

As for sample 8, which was also rated "×," only $BaTiO_3$ as a common material has been added to the inner electrodes. In this case, Ba that is the A-site element in $ABO_3$ in the perovskite structure is twelve-coordinate, but when it dissolves in the A-site in the ilmenite structure, the comparison needs to be based on its six-coordinate ionic radius, the six being the coordination number of the A-site in the ilmenite structure. The six-coordinate ionic radius of Ba is, as presented in Table 1, 1.35 Å. Accordingly, the ratio of the six-coordinate ionic radius of Ba to the six-coordinate ionic radius of silver, or the "ionic radius ratio," is 1.17. As a result, the "ionic radius ratio" fell outside the range of about 0.89 to about 1.02, resulting in a low coverage of 75%.

For these samples 4 and 8, the "ionic radius ratio" fell outside the range of about 0.89 to about 1.02, resulting in expulsion of $BaTiO_3$ from the inner electrode portion. Presumably as a result of this, the heat resistance of the inner electrodes was not improved, and the coverage was low.

Experimental Example 2

Base material of the Ceramic Forming the Dielectric Layers: $CaZrO_3$
1. Preparation of a $CaZrO_3$ Ceramic Raw Material that Will Form the Dielectric Layers As starting materials, powders of $CaCO_3$ and $ZrO_2$, which were base ingredients, and powders of MnO, $SiO_2$, and MgO, which were minor ingredients, were weighed out and mixed together for 72 hours in a ball mill. Then the resulting mixture was subjected to heat treatment for 2 hours, with the maximum temperature being 1000° C. In this manner, a $CaZrO_3$ ceramic raw material powder was obtained.
2. Preparation of a Conductive Paste for the Formation of Inner Electrodes A powder of the "$ABO_3$ oxide" specified in Table 3, which will be provided later herein, and the $CaZrO_3$ ceramic raw material powder for dielectric layers described above were used as ceramic powders included in the conductive paste for the formation of inner electrodes.

The powder of an "$ABO_3$ oxide" and $CaZrO_3$ ceramic raw material powder were weighed out to the "percentages added" specified in Table 3, and a conductive paste for the formation of inner electrodes was prepared through the same steps as in the case of Experimental Example 1 above.

In Table the "ionic 3, radius ratio (A-site element/metallic silver)" is presented as in the case of Table 2. It should be noted that for sample 18, the ratio of the six-coordinate ionic radius of the Ca element (1.00 Å), indicated in Table 1, to the six-coordinate ionic radius of silver (1.15 Å) is presented.
3. Production of a Multilayer Ceramic Capacitor A ceramic slurry including the $CaZrO_3$ ceramic raw material powder prepared in 1 above was prepared, and then ceramic green sheets were shaped by applying doctor blading to the ceramic slurry. After that, the same steps as in the case of Experimental Example 1 were followed to produce a sample multilayer ceramic capacitor.
4. Evaluation

TABLE 3

| Sample | ABO₃ oxide | Percentage added [% by volume] | | Ionic radius ratio (A-site element/metallic silver) | Coverage [%] | Assessment |
|---|---|---|---|---|---|---|
| | | ABO₃ oxide | CaZrO₃ | | | |
| 11 | $AgTiO_3$ | 100 | 0 | 1.00 | 84 | ○ |
| 12 | $EuTiO_3$ | 100 | 0 | 1.02 | 84 | ○ |
| 13 | $NaTiO_3$ | 100 | 0 | 0.89 | 83 | ○ |
| 14 | $CuTiO_3$ | 100 | 0 | 0.63 | 75 | x |
| 15 | $AgTiO_3$ | 10 | 90 | 1.00 | 83 | ○ |
| 16 | $EuTiO_3$ | 10 | 90 | 1.02 | 82 | ○ |
| 17 | $NaTiO_3$ | 10 | 90 | 0.89 | 81 | ○ |
| 18 | — | — | 100 | 0.87 | 72 | x |

The "coverage" was determined as presented in Table 3 following the same procedure as in the case of Experimental Example 1 and evaluated as in Experimental Example 1.
5. Discussion Samples 11 to 13 and 15 to 17 in Table 3 received an "assessment" of "○." For these samples 11 to 13 and 15 to 17, the inner electrodes include any of $AgTiO_3$, $EuTiO_3$, or $NaTiO_3$ as an $ABO_3$ oxide. The inner electrodes, furthermore, include silver as a conductive material.

Ionic radii are focused on here. First, as indicated in the "$AgTiO_3$" section in Table 1, the six-coordinate ionic radius of silver is 1.15 Å. Meanwhile, the six-coordinate ionic radii of the A-site elements in $AgTiO_3$, $EuTiO_3$, and $NaTiO_3$ as the $ABO_3$ oxides included in the inner electrodes of samples 11 to 13 and 15 to 17 are 1.15 Å, 1.17 Å, and 1.02 Å, respectively, as presented in Table 1.

For samples 11 to 13 and 15 to 17, which were rated "○," the ratio of the six-coordinate ionic radius of the A-site element in $ABO_3$ to the six-coordinate ionic radius of the metal element included in the conductive metal particles, or the "ionic radius ratio," is about 0.89 or greater and about 1.02 or less.

Overall, for $AgTiO_3$, $EuTiO_3$, and $NaTiO_3$ as the $ABO_3$ oxides in samples 11 to 13 and 15 to 17, the six-coordinate ionic radius of the A-site element in $ABO_3$ is equal to or close to the six-coordinate ionic radius of silver as the conductive metal that is to be included in the inner electrodes. The energy difference between the oxide and silver in the inner electrodes, therefore, is 0 or small, allowing the oxide to remain in the inner electrode portion rather than being expelled. The oxide acts to improve the heat resistance of the inner electrodes. Presumably as a result of this, samples 11 to 13 and 15 to 17 achieved a high coverage of 81% or more.

As can be seen from samples 15 to 17, furthermore, the percentage of $AgTiO_3$, $EuTiO_3$, or $NaTiO_3$ added is not necessarily 100%. As long as the percentage was about 10% or more, the advantage of improved coverage was observed compared with when none of $AgTiO_3$, $EuTiO_3$, or $NaTiO_3$ was included.

In contrast to these, for sample 14, which was rated "×," the $ABO_3$ oxide was $CuTiO_3$. The six-coordinate ionic radius of Cu, which is the A-site element in $ABO_3$, is 0.73 Å, as presented in Table 1. Accordingly, the ratio of the six-coordinate ionic radius of Cu to the six-coordinate ionic radius of silver, or the "ionic radius ratio," is 0.63. The "ionic radius ratio," therefore, fell outside the range of about 0.89 to about 1.02, resulting in a low coverage of 75%.

As for sample 18, which was also rated "×," only $CaZrO_3$ as a common material has been added to the inner electrodes. In this case, Ca that is the A-site element in $ABO_3$ in the perovskite structure is twelve-coordinate, but when it dissolves in the A-site in the ilmenite structure, the comparison needs to be based on its six-coordinate ionic radius, the six being the coordination number of the A-site in the ilmenite structure. The six-coordinate ionic radius of Ca is, as presented in Table 1, 1.00 Å. Accordingly, the ratio of the six-coordinate ionic radius of Ca to the six-coordinate ionic radius of silver, or the "ionic radius ratio," is 0.87. As a result, the "ionic radius ratio" fell outside the range of about 0.89 to about 1.02, resulting in a low coverage of 72%.

For these samples 14 and 18, the "ionic radius ratio" fell outside the range of about 0.89 to about 1.02, resulting in the expulsion of $CaZrO_3$ from the inner electrode portion. Presumably as a result of this, the heat resistance of the inner electrodes was not improved, and the coverage was low.

Experimental Example 3

Base material of the Ceramic Forming the Dielectric Layers: $SrTiO_3$
1. Preparation of a $SrTiO_3$ Ceramic Raw Material That Will Form the Dielectric Layers As starting materials, powders of $SrCO_3$ and $TiO_2$, which were base ingredients, and powders of MnO, $SiO_2$, and MgO, which were minor ingredients, were weighed out and mixed together for 72 hours in a ball mill. Then the resulting mixture was subjected to heat treatment for 2 hours, with the maximum temperature being 1000° C. In this manner, a $SrTiO_3$ ceramic raw material powder was obtained.
2. Preparation of a Conductive Paste for the Formation of Inner Electrodes A powder of the "$ABO_3$ oxide" specified in Table 4, which will be provided later herein, and the $SrTiO_3$ ceramic raw material powder for dielectric layers described above were used as ceramic powders included in the conductive paste for the formation of inner electrodes.

The powder of an "$ABO_3$ oxide" and $SrTiO_3$ ceramic raw material powder were weighed out to the "percentages added" specified in Table 4, and a conductive paste for the formation of inner electrodes was prepared through the same steps as in the case of Experimental Example 1 above.

In Table 4, the "ionic radius ratio (A-site element/metallic silver)" is presented as in the case of Table 2. It should be noted that for sample 28, the ratio of the six-coordinate ionic radius of the Sr element (1.18 Å), indicated in Table 1, to the six-coordinate ionic radius of silver (1.15 Å) is presented.
3. Production of a Multilayer Ceramic Capacitor A ceramic slurry including the $SrTiO_3$ ceramic raw material powder prepared in 1 above was prepared, and then ceramic green sheets were shaped by applying doctor blading to the ceramic slurry. After that, the same steps as in the case of Experimental Example 1 were followed to produce a sample multilayer ceramic capacitor.
4. Evaluation

TABLE 4

| Sample | $ABO_3$ oxide | Percentage added [% by volume] | | Ionic radius ratio (A-site element/ metallic silver) | Coverage [%] | Assessment |
|---|---|---|---|---|---|---|
| | | $ABO_3$ oxide | $SrTiO_3$ | | | |
| 21 | $AgTiO_3$ | 100 | 0 | 1.00 | 83 | ○ |
| 22 | $EuTiO_3$ | 100 | 0 | 1.02 | 83 | ○ |
| 23 | $NaTiO_3$ | 100 | 0 | 0.89 | 82 | ○ |
| 24 | $CuTiO_3$ | 100 | 0 | 0.63 | 72 | × |
| 25 | $AgTiO_3$ | 10 | 90 | 1.00 | 82 | ○ |
| 26 | $EuTiO_3$ | 10 | 90 | 1.02 | 82 | ○ |
| 27 | $NaTiO_3$ | 10 | 90 | 0.89 | 80 | ○ |
| 28 | — | — | 100 | 1.03 | 70 | × |

The "coverage" was determined as presented in Table 4 following the same procedure as in the case of Experimental Example 1 and evaluated as in Experimental Example 1.
5. Discussion Samples 21 to 23 and 25 to 27 in Table 4 received an "assessment" of "○." For these samples 21 to 23 and 25 to 27, the inner electrodes include any of $AgTiO_3$, $EuTiO_3$, or $NaTiO_3$ as an $ABO_3$ oxide. The inner electrodes, furthermore, include silver as a conductive material.

Ionic radii are focused on here. First, as indicated in the "$AgTiO_3$" section in Table 1, the six-coordinate ionic radius of silver is 1.15 Å. Meanwhile, the six-coordinate ionic radii of the A-site elements in $AgTiO_3$, $EuTiO_3$, and $NaTiO_3$ as the $ABO_3$ oxides included in the inner electrodes of samples 21 to 23 and 25 to 27 are 1.15 Å, 1.17 Å, and 1.02 Å, respectively, as presented in Table 1.

For samples 21 to 23 and 25 to 27, which were rated "○," the ratio of the six-coordinate ionic radius of the A-site element in $ABO_3$ to the six-coordinate ionic radius of the metal element included in the conductive metal particles, or the "ionic radius ratio," is about 0.89 or greater and about 1.02 or less.

Overall, for $AgTiO_3$, $EuTiO_3$, and $NaTiO_3$ as the $ABO_3$ oxides in samples 21 to 23 and 25 to 27, the six-coordinate ionic radius of the A-site element in $ABO_3$ is equal to or close to the six-coordinate ionic radius of silver as the conductive metal that is to be included in the inner electrodes. The energy difference between the oxide and silver in the inner electrodes, therefore, is 0 or small, allowing the oxide to remain in the inner electrode portion rather than being expelled. The oxide acts to improve the heat resistance of the inner electrodes. Presumably as a result of this, samples 21 to 23 and 25 to 27 achieved a high coverage of about 80% or more.

As can be seen from samples 25 to 27, furthermore, the percentage of $AgTiO_3$, $EuTiO_3$, or $NaTiO_3$ added is not necessarily 100%. As long as the percentage was about 10% or more, the advantage of improved coverage was observed compared with when none of $AgTiO_3$, $EuTiO_3$, or $NaTiO_3$ was included.

In contrast to these, for sample 24, which was rated "x," the $ABO_3$ oxide was $CuTiO_3$. The six-coordinate ionic radius of Cu, which is the A-site element in $ABO_3$, is 0.73 Å, as presented in Table 1. Accordingly, the ratio of the six-coordinate ionic radius of Cu to the six-coordinate ionic radius of silver, or the "ionic radius ratio," is 0.63. The "ionic radius ratio," therefore, fell outside the range of about 0.89 to about 1.02, resulting in a low coverage of 72%.

As for sample 28, which was also rated "x," only $SrTiO_3$ as a common material has been added to the inner electrodes. In this case, Sr that is the A-site element in $ABO_3$ in the perovskite structure is twelve-coordinate, but when it dissolves in the A-site in the ilmenite structure, the comparison needs to be based on its six-coordinate ionic radius, the six being the coordination number of the A-site in the ilmenite structure. The six-coordinate ionic radius of Sr is, as presented in Table 1, 1.18 Å. Accordingly, the ratio of the six-coordinate ionic radius of Sr to the six-coordinate ionic radius of silver, or the "ionic radius ratio," is 1.03. As a result, the "ionic radius ratio" fell outside the range of about 0.89 to about 1.02, resulting in a low coverage of 70%.

For these samples 24 and 28, the "ionic radius ratio" fell outside the range of about 0.89 to about 1.02, resulting in the expulsion of f $SrTiO_3$ from the inner electrode portion. Presumably as a result of this, the heat resistance of the inner electrodes was not improved, and the coverage was low.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including a plurality of dielectric layers made of ceramic and stacked together and a plurality of inner electrodes arranged along a plurality of interfaces between the dielectric layers such that each of the plurality of inner electrodes extend along a respective one of the plurality of interfaces; wherein
the plurality of inner electrodes include silver and at least one of $AgTiO_3$, $EuTiO_3$, or $NaTiO_3$; and
the plurality of inner electrodes are made of a conductive paste including the at least one of $AgTiO_3$, $EuTiO_3$, or $NaTiO_3$.

2. The multilayer ceramic capacitor according to claim 1, wherein each of the plurality of inner electrodes has a thickness of about 1 μm or less.

3. The multilayer ceramic capacitor according to claim 1, wherein each of the plurality of inner electrodes has a coverage of about 80% or more.

4. The multilayer ceramic capacitor according to claim 1, wherein the plurality of dielectric layers include at least one of $BaTiO_3$, $SrTiO_3$, or $CaZrO_3$, and the plurality of inner electrodes further include the at least one of $BaTiO_3$, $SrTiO_3$, or $CaZrO_3$ included in the dielectric layers.

5. The multilayer ceramic capacitor according to claim 1, wherein the ceramic of the plurality of dielectric layers includes $ABO_3$, where A is at least one of Ba, Ca, or Sr, and B is at least one of Ti or Zr.

6. The multilayer ceramic capacitor according to claim 5, wherein the ceramic of the plurality of dielectric layers further includes at least one of Mn, Mg, Si, Y, Dy, or Gd.

7. The multilayer ceramic capacitor according to claim 5, wherein a ratio of a six-coordinate ionic radius of an A-site element in the $ABO_3$ to a six-coordinate ionic radius of the silver is about 0.89 or greater and about 1.02 or less.

8. The multilayer ceramic capacitor according to claim 1, further comprising outer electrodes on the multilayer body and connected to respective ones of the plurality of inner electrodes.

9. The multilayer ceramic capacitor according to claim 8, wherein the outer electrodes include Ag or Cu.

10. The multilayer ceramic capacitor according to claim 8, wherein the outer electrodes include Ni plating or Sn plating.

11. The multilayer ceramic capacitor according to claim 1, wherein a percentage of the at least one of $AgTiO_3$, $EuTiO_3$, or $NaTiO_3$ is about 10% or more.

12. The multilayer ceramic capacitor according to claim 1, wherein the at least one of $AgTiO_3$, $EuTiO_3$, or $NaTiO_3$ has an ilmenite crystal structure.

* * * * *